United States Patent [19]

Yang

[11] Patent Number: 5,685,549
[45] Date of Patent: Nov. 11, 1997

[54] CHUCK ASSEMBLY FOR A TOOL BIT

[76] Inventor: Tsung-Hsun Yang, No. 167, Yung-Feng Rd., Tai-Ping Hsiang, Taichung Hsien, Taiwan

[21] Appl. No.: 611,475

[22] Filed: Mar. 5, 1996

[51] Int. Cl.$^6$ .................................................. B23B 31/10
[52] U.S. Cl. ........................... 279/64; 279/60; 279/902
[58] Field of Search ............................. 279/60–65, 902

[56] References Cited

U.S. PATENT DOCUMENTS

| | | | |
|---|---|---|---|
| 1,321,969 | 11/1919 | Avis | 279/60 |
| 1,775,994 | 9/1930 | Emrick | 279/60 |
| 4,527,809 | 7/1985 | Umbert | 279/60 |
| 5,031,925 | 7/1991 | Tatsu et al. | 279/902 |

FOREIGN PATENT DOCUMENTS 583004  12/1946  United Kingdom ..................... 279/60

*Primary Examiner*—Steven C. Bishop
*Attorney, Agent, or Firm*—Foley & Lardner

[57] ABSTRACT

A chuck assembly for a tool bit includes a hollow chuck body which has a front end formed with a locking portion and which is formed with at least one radial opening therethrough, a cylindrical push member which is disposed slidably in the chuck body and which is formed with an external screw thread, a hollow truncated cone-shaped seater which is disposed in front of the push member and which is formed with a plurality of angularly spaced and longitudinally extending slits, a plurality of elongated clamping members which extend slidably and respectively into the slits and which have rear ends connected to the push member, a hollow truncated cone-shaped front cap which encloses the seater and which has a rear end connected to the locking portion of the chuck body, and a drive ring which is provided rotatably around the chuck body and which is formed with an internal screw thread that meshes with the external screw thread of the push member.

9 Claims, 5 Drawing Sheets

5,685,549

CHUCK ASSEMBLY FOR A TOOL BIT

BACKGROUND OF THE INVENTION

1. Field of the Invention

The invention relates to a chuck assembly, more particularly to a chuck assembly which is relatively inexpensive and convenient to manufacture.

2. Description of the Related Art

Referring to FIG. 1, a conventional chuck assembly 10 is shown to comprise a cylindrical chuck body 11, an annular drive gear 12, a tubular retaining sleeve 13 and a plurality of elongated clamping pieces 14 (only one is shown). The chuck body 11 has an axial insert hole 111 formed therethrough for receiving a section of a tool bit 20, such as a drill bit, an inner wall surface formed with a plurality of inclined guide grooves 112 which extend axially and which guide movement of the clamping pieces 14, respectively, and a plurality of inclined screw holes 113 for engaging threadedly the clamping pieces 14. The chuck body 11 further has an outer wall surface formed with a radial insert bore 114. The drive gear 12 is provided around the chuck body 11 and has a teethed front face 121 and an internally threaded inclined inner wall surface 122. The retaining sleeve 13 encloses a rear portion of the chuck body 11 and has a front end connected to the drive gear 12. Each of the clamping pieces 14 extends into a corresponding one of the guide grooves 112 and has a threaded side 141 which meshes with the inner wall surface 122 of the drive gear 12 and one of the screw holes 113 in the chuck body 11.

As shown in FIGS. 1 and 2, the positioning shaft 211 of a chuck key 21 is extended into the insert bore 114 in the chuck body 11 when the tool bit 20 is inserted into the insert hole 111 in the chuck body 11. The rotary gear 212 of the chuck key 21 meshes with the front face 121 of the drive gear 12 at this time. By rotating the chuck key 21, the rotary gear 212 drives rotatably the drive gear 12, thereby enabling the drive gear 12 to move the clamping pieces 14 along the guide grooves 112 so as to tighten or loosen the tool bit 20 from the chuck body 11.

Some of the drawbacks of the conventional chuck assembly 10 are as follows:

1. The guide grooves 112 have to be manufactured precisely. Otherwise, the forces applied by the clamping pieces 14 on the tool bit 20 will be uneven. This high precision requirement results in a higher manufacturing cost.

2. The screw holes 113 also have to be manufactured precisely. Otherwise, improper movement of the clamping pieces 14 will occur.

SUMMARY OF THE INVENTION

Therefore, the object of the present invention is to provide a chuck assembly which is relatively inexpensive and convenient to manufacture.

Accordingly, the chuck assembly of the present invention comprises:

- a hollow chuck body having a front end formed with a locking portion, said chuck body being formed with at least one radial opening therethrough;
- a cylindrical push member disposed slidably in the chuck body and formed with an external screw thread;
- a hollow truncated cone-shaped seater disposed in front of the push member and formed with a plurality of angularly spaced and longitudinally extending slits;
- a plurality of elongated clamping members extending slidably and respectively into the slits and having rear ends connected to the push member;
- a hollow truncated cone-shaped front cap which encloses the seater and which has a rear end connected to the locking portion of the chuck body; and
- a drive ring provided rotatably around the chuck body and formed with an internal screw thread which meshes with the external screw thread of the push member.

Rotation of the drive ring relative to the chuck body results in linear movement of the push member and in corresponding movement of the clamping members along the slits to clamp or loosen a tool bit that extends into the front cap and the seater.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
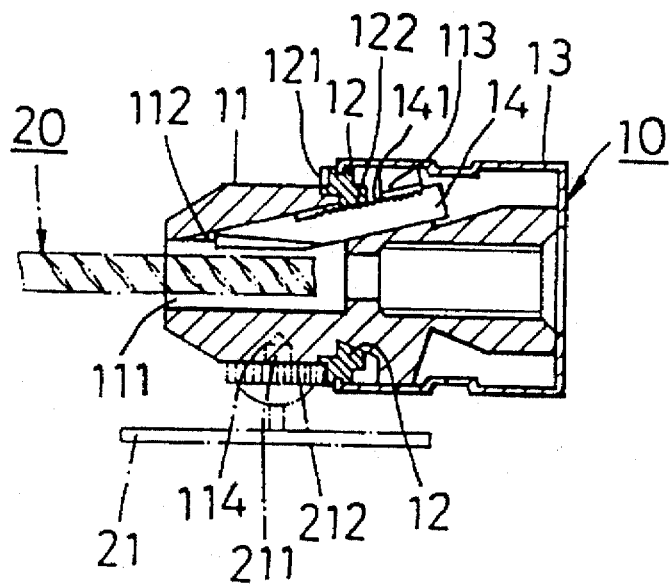
FIG. 1 is a sectional view of a conventional chuck assembly.
Figure 2:
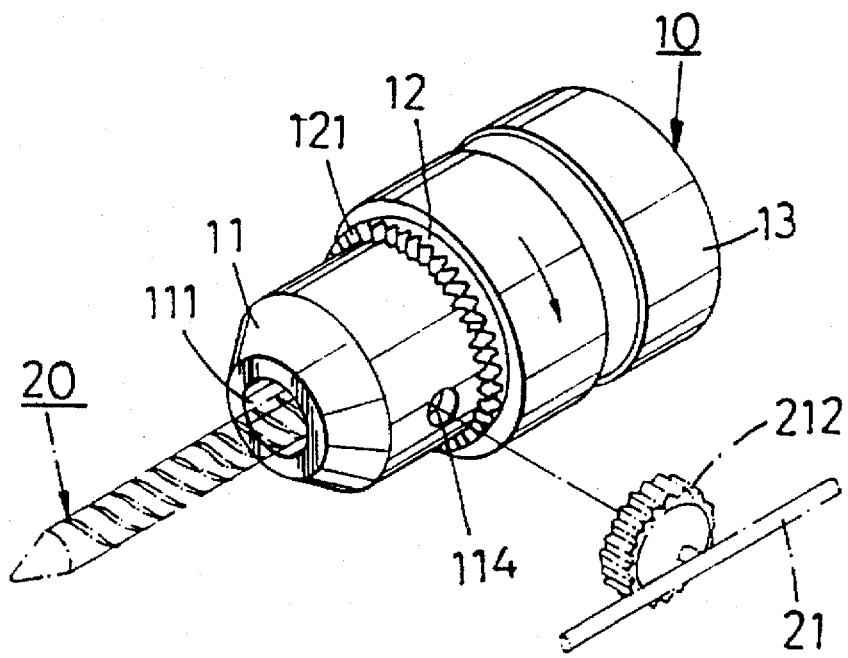
FIG. 2 is a perspective view of the conventional chuck assembly shown in FIG. 1.
Figure 3:
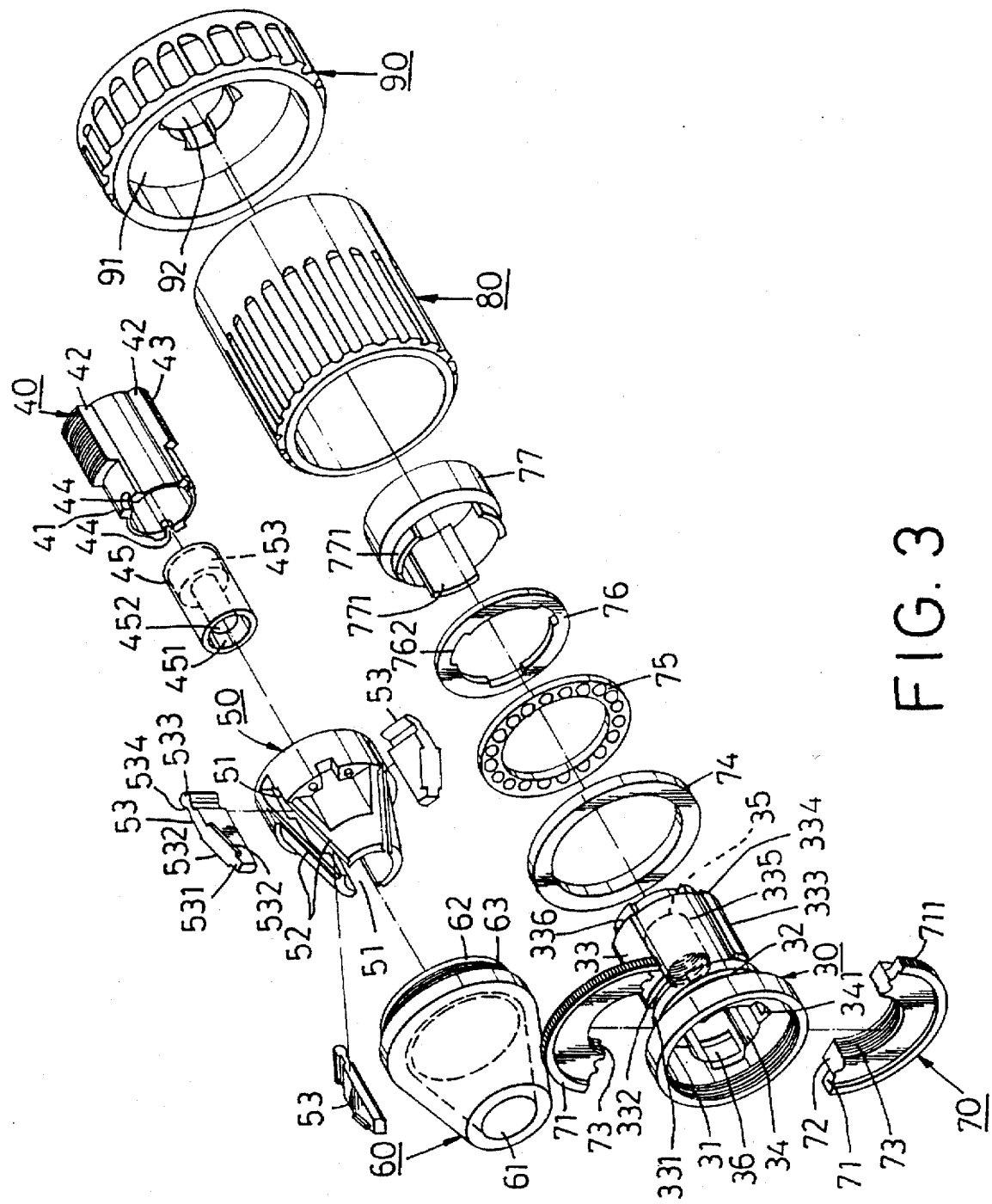
FIG. 3 is an exploded view of the preferred embodiment of a chuck assembly according to the present invention.

Referring to FIG. 3, the preferred embodiment of a chuck assembly according to the present invention is shown to comprise a hollow chuck body 30, a cylindrical push member 40, a hollow truncated cone-shaped seater 50, a hollow truncated cone-shaped front cap 60, a drive ring 70, a sleeve member 80 and a rear cap 90. The push member 40 is disposed slidably in the chuck body 30, the seater 50 is disposed in front of the push member 40, the front cap 60 is secured to a front end of the chuck body 30 and encloses the seater 50 therein, the drive ring 70 is provided rotatably around the chuck body 30, the sleeve member 80 is disposed around the chuck body 30, and the rear cap 90 is disposed rotatably on a rear end of the sleeve member 80.

The chuck body 30 is a hollow cylindrical member formed with a locking portion 31 at a front end, an annular retaining groove 32 adjacent to the locking portion 31, and a connecting portion 33 adjacent to the retaining groove 32. The connecting portion 33 has a ring section 331 adjacent to the retaining groove 32, an annular groove 332 adjacent to the ring section 331, and a tubular connecting section 333 adjacent to the annular groove 332. The connecting section 333 has an outer wall surface formed with three axially extending and angularly spaced projections 334. An indentation 335 is formed between two adjacent projections 334. The connecting section 333 is further formed with a multi-sided rearward extension 336 and an axial internally threaded hole 35 for mounting the chuck body 30 onto a drive shaft of a tool bit driving device (not shown). In this embodiment, the chuck body 30 confines a receiving chamber 34 and has an inner wall surface formed with three angularly spaced and axially extending receiving grooves 341. Three radial openings 36 extend from the receiving grooves 341 through the retaining groove 32, respectively.

The push member 40 includes a hollow cylindrical tube 41 which has an outer wall surface formed with three axially extending and angularly spaced projecting strips 42. The strips 42 extend respectively into the receiving grooves 341 in the chuck body 30. Each of the strips 42 has a rear portion formed with an external screw thread 43 and a front portion formed with an engaging hole 44. A cylindrical body 45 is disposed inside the push member 40. The cylindrical body 45 confines an axial through bore 452 which has a diverging front section 451 and an enlarged rear section 453. The cylindrical body 45 permits the retention of a screw (not shown) that is used when mounting the chuck assembly on the drive shaft of the tool bit driving device (not shown).

The seater 50 is formed with three longitudinally extending slits 51 which are aligned with the engaging holes 44 in the push member 40. Each slit 51 is provided with a pair of guide rails 52 disposed respectively on opposite longitudinal edges thereof. Three elongated clamping members 53 extend slidably and respectively into the slits 51. Each clamping member 53 has an inclined face 531 which conforms with the outer wall surface of the seater 50 and is provided with a pair of side fins 532 which are disposed slidably on the guide rails 52 in the respective slit 51. Each clamping member 53 further has a rear end formed with a cylindrical lug 533. The cylindrical lug 533 has a restricted neck portion 534 and engages a respective one of the engaging holes 44 in the push member 40 to connect the clamping members 53 to the push member 40.

The front cap 60 has an axial opening 61 which is adapted to permit the extension of a tool bit 100 (see FIG. 5) therethrough. The front cap 60 further has a rear end which is provided with a connecting ring 62. The connecting ring 62 is formed with an external screw thread 63 for engaging the locking portion 31 of the chuck body 30.

The drive ring 70 includes two complementary semiannular ring parts 71 and is to be provided rotatably around the chuck body 30 in the retaining groove 32. Each ring part 71 has an axial ring projection 72 that is formed with a screw thread 73 on an internal face. Each ring part 71 further has a teethed outer surface 711. A coupling means, which includes an annular sleeve 74, a ball bearing unit 75, a stop ring 76 and a positioning ring 77, secures rotatably the drive ring 70 on the chuck body 30. The annular sleeve 74 is sleeved on the ring projections 72 to join together the ring parts 71. The ball bearing unit 75 is provided on the ring section 331 of the connecting portion 33 of the chuck body 30. The stop ring 76 is provided in the annular groove 332 in the connecting portion 33 to retain the ball bearing unit 75 on the chuck body 30. The positioning ring 77 is sleeved on the connecting portion 33 of the chuck body 30 thereafter. The positioning ring 77 is formed with three insert flanges 771 which extend into clearances 337 (see FIG. 4) formed between retaining notches 762 in the stop ring 76 and the indentations 335 in the connecting portion 33 of the chuck body 30.

The sleeve member 80 is a tubular body which is disposed around the chuck body 30. The rearward extension 336 on the connecting portion 33 of the chuck body 30 extends out of the sleeve member 80.

The rear cap 90 is to be disposed rotatably on a rear end of the sleeve member 80, and has a wall 91 formed with a multi-sided opening 92 for engaging the rearward extension 336 of the chuck body 30. Thus, the rear cap 92 is connected non-rotatably to the chuck body 30.

Figure 4:
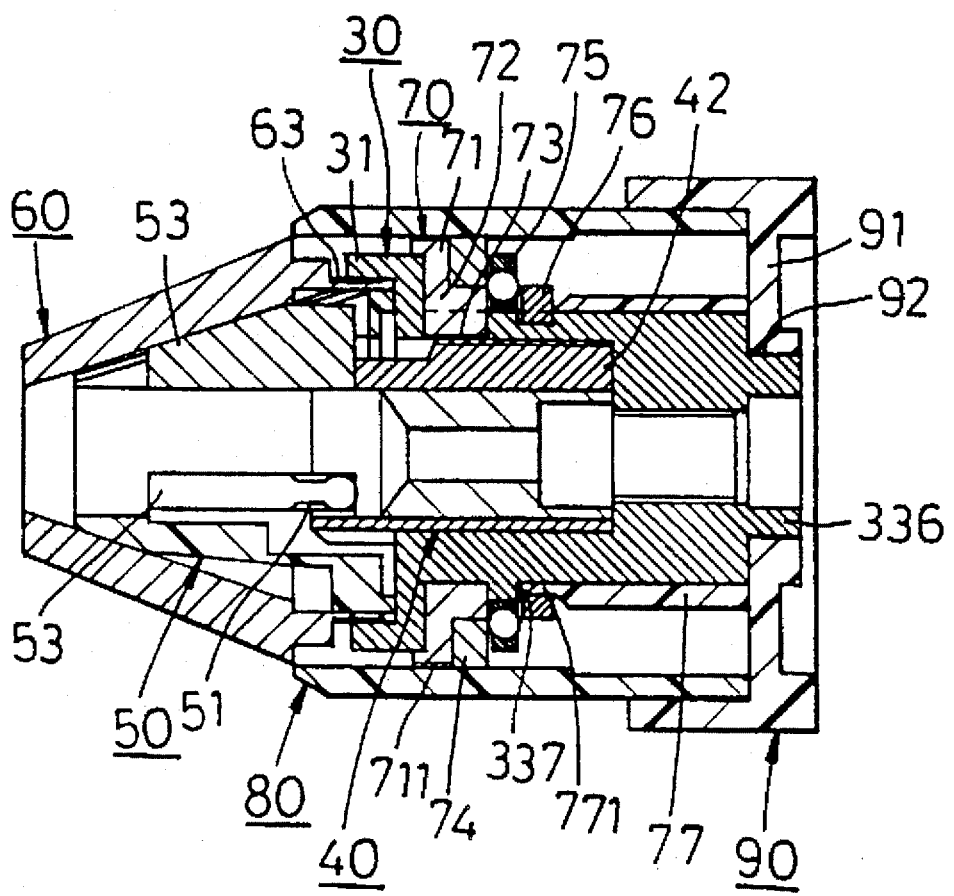
FIG. 4 is a sectional view of the preferred embodiment to illustrate its assembly.

Assembly of the preferred embodiment is as follows: Referring to FIG. 4, the push member 40 is provided in the receiving chamber 34 of the chuck body 30 such that the strips 42 thereon are disposed slidably in the receiving grooves 341. The external screw threads 43 of the strips 42 are accessible via the radial openings 36 in the chuck body 30, and the front end of the push member 40 extends out of the locking portion 31 of the chuck body 30 at this time. The cylindrical body 45 is then inserted into the push member 40, and the seater 50 is extended into the locking portion 31. The slits 51 in the seater 50 are aligned with the engaging holes 44 in the push member 40, and the clamping members 53 are extended into the slits 51 and are connected to the push member 40 such that the cylindrical lugs 533 of the clamping members 53 extend into the engaging holes 44 and such that the side fins 532 on the clamping members 53 are disposed on the guide rails 52 in the respective slit 51. Therefore, forward and rearward movement of the push member 40 can result in corresponding forward and rearward movement of the clamping members 53. Moreover, since the seater 50 is shaped as a truncated cone and is retained in the similarly shaped front cap 60, forward movement of the clamping members 53 will result in a tool bit tightening action, while rearward movement of the clamping members 53 will result in a tool bit loosening action.

After the clamping members 53 have been installed, the ring parts 71 are installed in the retaining groove 32 of the chuck body 30 such that the screw threads 73 thereon mesh with the external screw threads 43 on the strips 42 of the push member 40. The annular sleeve 74 is subsequently installed on the ring projections 72 of the ring parts 71 to position the latter. The ball bearing unit 75 is then provided on the ring section 331 of the connecting portion 33 of the chuck body 30, and the stop ring 76 is provided in the annular groove 332 in the connecting portion 33, thereby retaining the ball bearing unit 75 on the chuck body 30. The clearances 337 are formed between the retaining notches 762 in the stop ring 76 and the indentations 335 in the connecting portion 33 at this time. Thereafter, the positioning ring 77 is sleeved on the connecting portion 33 of the chuck body 30 such that the insert flanges 771 thereof extend into the clearances 337. The sleeve member 80 is disposed around the chuck body 30 such that the rearward extension 336 on the connecting portion 33 extends out of the sleeve member 80. The sleeve member 80 is then hot pressed so that the inner wall surface thereof engages the teethed outer surfaces 711 of the ring parts 71. Finally, the rear cap 90 is disposed rotatably on the rear end of the sleeve member 80 such that the multi-sided opening 92 therein engages the rearward extension 336 of the chuck body 30, thereby connecting non-rotatably the rear cap 90 to the chuck body 30. Assembly of the preferred embodiment is completed at this time.

Figure 5:
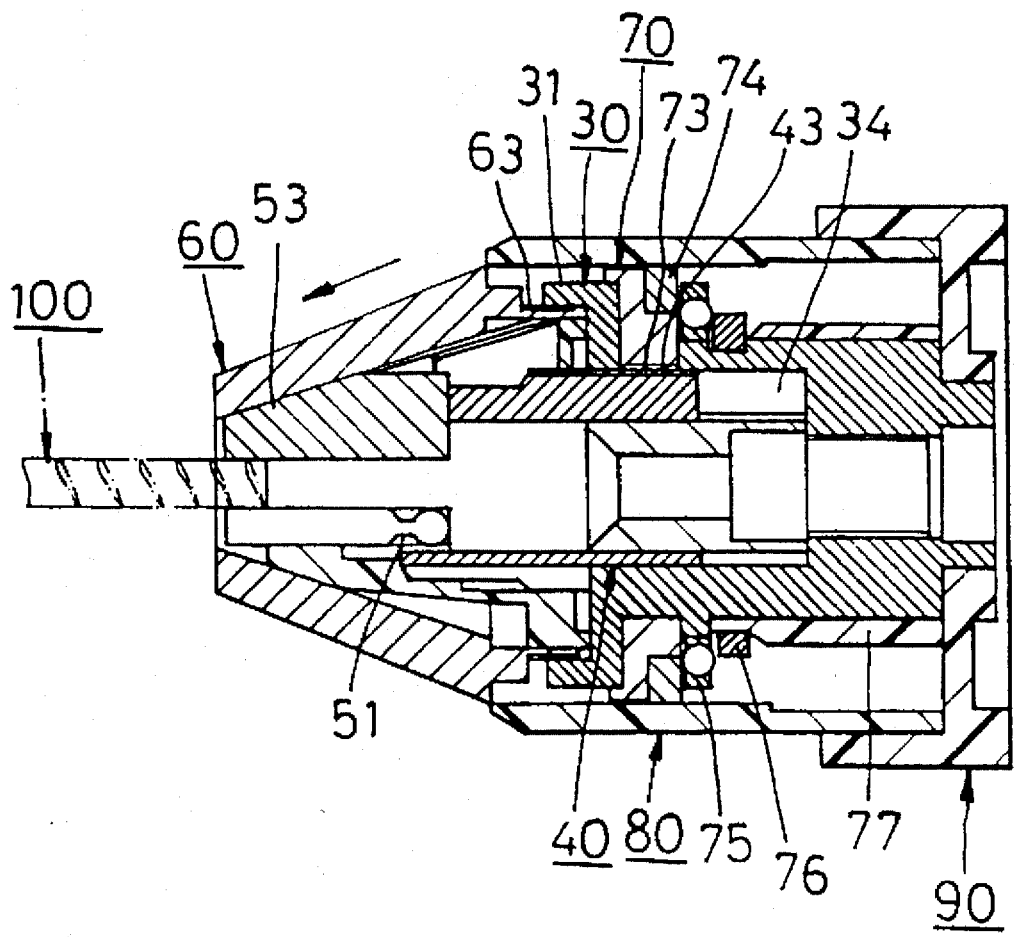
FIG. 5 illustrates how a tool bit is tightened on the chuck assembly of the present invention.

Referring to FIG. 5, when it is desired to clamp tightly the tool bit 100, the sleeve member 80 is rotated in a clockwise direction, thereby causing the drive ring 70 to rotate therewith. Due to the engagement between the screw thread 73 and the external screw threads 43 on the push member 40, rotation of the drive ring 70 will result in linear forward movement of the push member 40 relative to the chuck body 30. The clamping members 53 are connected to the front end of the push member 40 and extend into the slits 51 in the seater 50. Since the seater 50 is shaped as a truncated cone, the slits 41 therein inherently incline toward the axis of the seater 50. Thus, since the seater 50 is enclosed by the truncated cone-shaped front cap 60, forward movement of the push member 40 will result in corresponding forward movement of the clamping members 53 so as to clamp tightly the tool bit 100. The side fins 532 on the clamping members 53 are disposed slidably on the guide rails 52 in the respective slit 51 to ensure proper movement of the clamping members 53 with respect to the seater 50.

Figure 6:
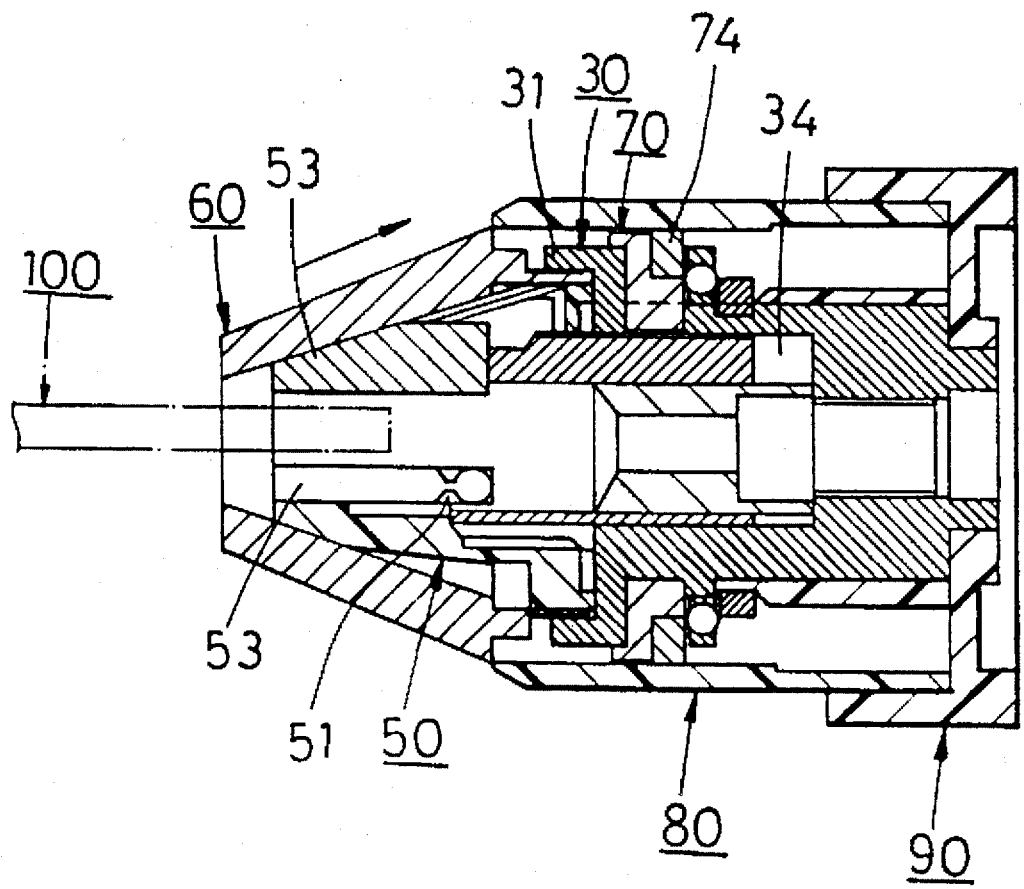
FIG. 6 illustrates how a tool bit is loosened from the chuck assembly of the present invention.

As shown in FIG. 6, when it is desired to loosen the tool bit 100, the sleeve member 80 is rotated in a counterclockwise direction so as to cause the drive ring 70 to rotate in the same direction and drive the push member 40 to move in a linear rearward direction relative to the chuck body 30. Rearward movement of the push member 40 results in corresponding rearward movement of the clamping members 53, thereby loosening the tool bit 100.

The advantages and characterizing features of the chuck assembly of the present invention are as follows:

1. The screw threads used in the present invention include the connection between the chuck body 30 and the truncated cone-shaped front cap 60, and the connection between the push member 40 and the drive ring 70. Unlike the aforementioned prior art, the screw threads in this invention can be manufactured with a lower degree of precision to result in a lower manufacturing cost.

2. The various components of the chuck assembly are suitable for mass production since they can be manufactured by known casting or forging processes.

3. The sleeve member 80 is simply rotated to tighten or loosen the tool bit 100. Therefore, there is no need for using a chuck key as required in the aforementioned prior art. Operation of the chuck assembly of the present invention is thus facilitated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A chuck assembly for a tool bit, comprising:
   a hollow chuck body having a front end formed with a locking portion, said chuck body being formed with at least one radial opening therethrough;
   a cylindrical push member disposed slidably in said chuck body and formed with an external screw thread;
   a hollow truncated cone-shaped seater disposed in front of said push member and formed with a plurality of angularly spaced and longitudinally extending slits;
   a plurality of elongated clamping members extending slidably and respectively into said slits and having rear ends connected to said push member;
   a hollow truncated cone-shaped front cap which encloses said seater and which has a rear end connected to said locking portion of said chuck body; and
   a drive ring provided rotatably around said chuck body and formed with an internal screw thread which meshes with said external screw thread of said push member;
   whereby, rotation of said drive ring relative to said chuck body results in linear movement of said push member and in corresponding movement of said clamping members along said slits to clamp or loosen the tool bit that extends into said front cap and said seater.

2. The chuck assembly as claimed in claim 1, wherein said push member is formed as a hollow cylindrical tube and has a front end formed with a plurality of engaging holes, said rear ends of said clamping members being formed with cylindrical lugs which engage said engaging holes to connect said clamping members to said push member.

3. The chuck assembly as claimed in claim 1, wherein each of said slits is provided with a pair of guide rails disposed respectively on opposite longitudinal edges thereof, each of said clamping members being formed with a pair of guide fins which are disposed slidably on said guide rails in the respective one of said slits.

4. The chuck assembly as claimed in claim 1, wherein said chuck body has an inner wall surface formed with at least one axially extending receiving groove which is aligned with a corresponding said radial opening, said push member having an outer wall surface formed with at least one axially extending projecting strip which extends slidably into a corresponding said receiving groove and which has said external screw thread formed thereon.

5. The chuck assembly as claimed in claim 1, wherein said drive ring includes two complementary ring parts.

6. The chuck assembly as claimed in claim 5, further comprising an annular sleeve for joining together said ring parts.

7. The chuck assembly as claimed in claim 1, further comprising coupling means for securing rotatably said drive ring on said chuck body.

8. The chuck assembly as claimed in claim 1, further comprising a tubular sleeve member disposed around said chuck body and secured to said drive ring, whereby rotation of said sleeve member results in corresponding rotation of said drive ring relative to said chuck body.

9. The chuck assembly as claimed in claim 8, further comprising a rear cap disposed rotatably on a rear end of said sleeve member and connected non-rotatably to a rear end of said chuck body.

* * * * *